US012756878B2

(12) United States Patent
Marchand et al.

(10) Patent No.: US 12,756,878 B2
(45) Date of Patent: Oct. 6, 2026

(54) METHOD AND NETWORK EQUIPMENT FOR LOCAL ENCODING OF DIGITAL TERRESTRIAL TELEVISION CONTENT INTO SEGMENTS OF ADAPTIVE CONTENT OVER HTTP

(71) Applicant: ORANGE, Issy-les-Moulineaux (FR)

(72) Inventors: Hervé Marchand, Chatillon Cedex (FR); Olivier Gaste, Chatillon Cedex (FR)

(73) Assignee: ORANGE, Issy-les-Moulineaux (FR)

(*) Notice: Subject to any disclaimer, the term of this patent is extended or adjusted under 35 U.S.C. 154(b) by 2 days.

(21) Appl. No.: 18/958,465

(22) Filed: Nov. 25, 2024

(65) Prior Publication Data

US 2025/0184549 A1 Jun. 5, 2025

(30) Foreign Application Priority Data

Dec. 1, 2023 (FR) ....................................... 2313443

(51) Int. Cl.
*H04N 21/238* (2011.01)
*H04N 21/25* (2011.01)
*H04N 21/266* (2011.01)
*H04N 21/845* (2011.01)

(52) U.S. Cl.
CPC ......... *H04N 21/238* (2013.01); *H04N 21/251* (2013.01); *H04N 21/266* (2013.01); *H04N 21/8456* (2013.01)

(58) Field of Classification Search
None
See application file for complete search history.

(56) References Cited

U.S. PATENT DOCUMENTS

2016/0112730 A1* 4/2016 De Vleeschauwer .. H04L 65/80 725/110
2016/0380853 A1* 12/2016 Lotfallah ............ H04L 12/1432 709/224
2019/0364330 A1 11/2019 Moroney et al.

FOREIGN PATENT DOCUMENTS

EP 4002856 A1 5/2022

OTHER PUBLICATIONS

B. Cain et al., "Internet Group Management Protocol, Version 3," Network Working Group, Request for Comments: 3376, Oct. 2002.
French Search Report and Written Opinion dated Jun. 26, 2024 for corresponding French Application No. 2313443, filed Dec. 1, 2023.

(Continued)

*Primary Examiner* — James R Marandi
(74) *Attorney, Agent, or Firm* — David D. Brush; Westman, Champlin & Koehler, P.A.

(57) ABSTRACT

A method for managing access by a managing entity to content available on at least a first server providing the content in the form of data segments over a data telecommunication network and a second server providing a streaming service separate from the data telecommunication network. The method includes, in the managing entity, the selection of a server out of the first server and the second server, and, when the second server is selected: a request for access to a content from the second server; the encoding of a stream of segments based on the content; the publication of information relating to the content suitable for making it possible to decode the stream of segments.

11 Claims, 1 Drawing Sheet

(56) References Cited

OTHER PUBLICATIONS

Extended European Search Report dated Apr. 1, 2025 for corresponding European Application No. 24216278.2.

Paul Higgs, "DVB-I at IBC 2019," DVB, Digital Video Broadcasting, C/O EBU—17A Ancienne Route—CH-1218 Grand Saconnex, Geneva—Switzerland, No. r14, Aug. 16, 2019 (Aug. 16, 2019), XP017857394.

* cited by examiner

[Fig. 1]
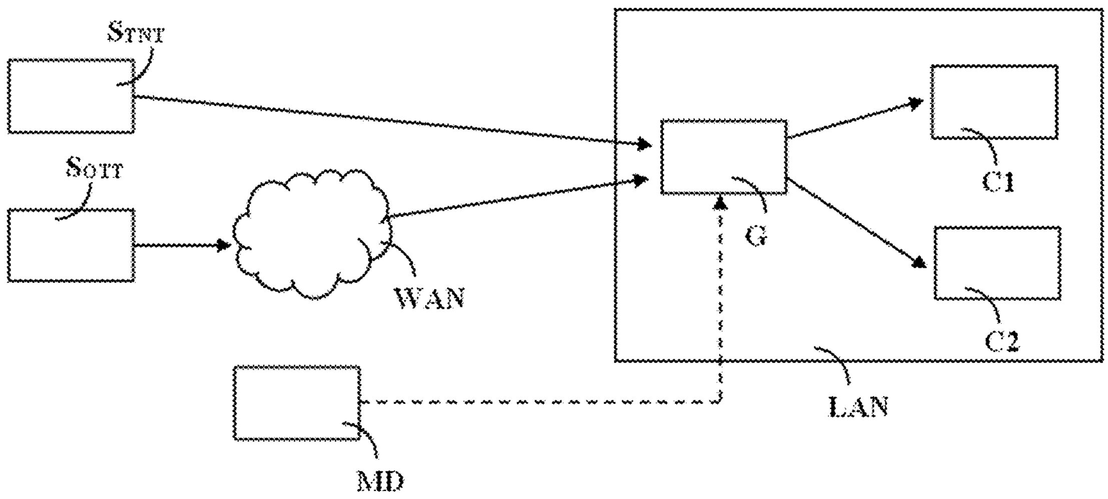
[Fig. 2]
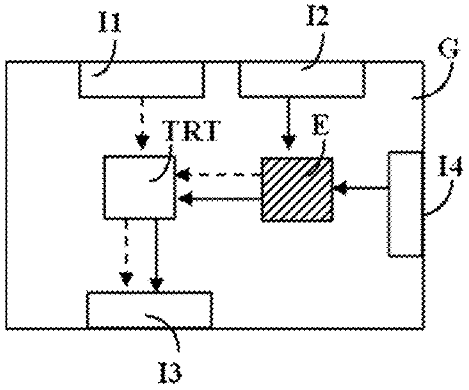
[Fig. 3]
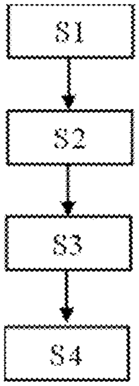

METHOD AND NETWORK EQUIPMENT FOR LOCAL ENCODING OF DIGITAL TERRESTRIAL TELEVISION CONTENT INTO SEGMENTS OF ADAPTIVE CONTENT OVER HTTP

TECHNICAL FIELD

This invention relates to the distribution of content, particularly of audio-visual content, over telecommunication networks to end clients for the purpose of their production for users.

It particularly applies to the distribution by management entities, deployed on equipment and intended to stream these contents in the form of segments.

BACKGROUND

A very significant portion of the distribution of audio-video content is done from a server of a content supplier to clients over public telecommunication networks without any control over it. The audio-video content distribution service is generally provided by an entity separate from the public telecommunication networks operator, and in particular from the Internet access provider. This type of service is typically known as "over-the-top", or OTT service.

These over-the-top, or OTT distribution services comprise the private distribution of audio-video content, via platforms or social networks, but also content distribution of "on-demand video" type or in real time, from content servers.

OTT online services allow access to all types of media, but also audio, video or text. This therefore includes music, podcast, film, series, documentary, press services etc.

The streaming of audio-video content in OTT is conventionally based on the streaming of content in the form of segments. One and the same item of content (or simpler stated "content" in the following) can be made available in different streams of segments, the segments then having different sizes corresponding to different resolutions. The clients retrieve the content segment by segment, these segments corresponding to a chosen resolution. This resolution can be dynamically modified during streaming of the content, particularly according to the bandwidth available over the telecommunication network connecting the content server and the end client, and the load thereof.

This type of service and this technology allowing their deployment nonetheless put a very heavy strain on the telecommunication network, particularly when a content is requested by a very large number of clients: the content server must then transmit streams of data segments, at various resolutions, to this set of clients.

It may then be necessary to overdimension the telecommunication network to be able to absorb the traffic peaks which are encountered during the streaming of a content with a large audience.

In order to substantially reduce this limitation, it is possible to stream such a content in "multicast" mode. It then becomes possible to share the transmission of the content, at a given resolution, from the content server to different nodes of a transmission tree in order to stream it to the set of clients having requested this content at this resolution. In this way enormous savings on bandwidth can be made.

However, this technology requires modification of the infrastructure of the telecommunication network to be able to deploy such a transmission tree, composed for example of nodes suitable for implementing the IGMP (Internet Group Management Protocol) defined in RFC 3376 of the IETF for its version 3.

There is therefore a need to improve the current provisions of the prior art.

SUMMARY OF THE INVENTION

An exemplary embodiment of the present disclosure has the aim of avoiding having to make modifications to the telecommunication network, insofar as it can be managed by an entity separate from that managing the audio-visual content server. It therefore aims to rely solely on the capacities of the equipment of the local networks of the end users.

For these purposes, according to a first aspect, this invention can be implemented by a method for managing access by a managing entity to content available on at least a first server providing said content in the form of data segments over a data telecommunication network and a second server providing a streaming service separate from said data telecommunication network, comprising, in said managing entity, the selection of a server out of said first server and said second server, and, when said second server is selected:

- a request for access to a content from the second server;
- the encoding of a stream of segments based on said content;
- the publication of information relating to said content suitable for making it possible to decode said stream of segments.

Thus, this gateway in particular makes it possible to divert heavy traffic to a third-party network, of OTT type for example, separate from the data telecommunication network (Internet), and also offer a unified view of the different kinds of content available from the content service.

According to exemplary embodiments, the invention comprises one or more of the following features which can be used separately or in partial combination with one another or in full combination with one another:

- said second server is selected when said content is a special content. The traffic can thus be forwarded according to the nature of the content and/or the choice by the content manager to consider a content as "special".
- the streaming service separate from said telecommunication network is a digital terrestrial television, TNT, service. It is thus possible to benefit from this streaming mode, but other streaming services are also possible.
- said content is a content, the audience of which is greater than a given threshold. Thus, as soon as a content has a large audience (current or predicted), and is therefore liable to generate a significant load on the network, it is possible to benefit from the local functionalities of the gateway to offload the network and the content servers.
- the method comprises the prior determination of a content, said determination being based on predictions of traffic for available content. This makes it possible to avoid congestion in the event of a traffic peak and to only allow a reaction "after the fact". The prediction makes it possible to switch over to a separate streaming service even before the network and the first content server are truly loaded.
- said information comprises a set of manifests generated by the managing entity. Thus, for clients, all the content is presented and accessible in the same way.

said manifests and said segments only relate to a single resolution of said content, which makes it possible to minimize the load of the gateway assuming that that of the local network is not very penalizing.

Another aspect of the invention relates to an entity for managing the access by a client to content available on at least a first server providing said content in the form of data segments over a data telecommunication network and a second server providing a streaming service separate from said data telecommunication network, said managing entity comprising a processor configured to carry out the following steps:

the selection of a server out of said first server and said second server, and, when said second server is selected:

a request for access to a content from the second when the content is a special content;

the encoding of a stream of segments based on said content;

the publication of information relating to said content suitable for making it possible to decode said stream of segments Another aspect of the invention relates to a gateway including a managing entity as previously described. Also, another aspect of the invention relates to a client including a managing entity as previously described.

Another aspect of the invention relates to a computer program able to be implemented on a managing entity, the program comprising code instructions which, when it is executed by a processor, carries out the steps of the method as previously defined.

Another aspect of the invention relates to a data medium on which a series of program code instructions has been stored for executing a method as previously defined.

BRIEF DESCRIPTION OF THE DRAWINGS

Other aspects, aims, advantages and features will become more clearly apparent on reading the following detailed description of preferred embodiments thereof, given by way of non-limiting example, and with reference to the appended drawings on which:

FIG. 1 illustrates a context of implementation of a method according to embodiments.

FIG. 2 illustrates an example of functional architecture of a managing entity according to an embodiment.

FIG. 3 shows, in diagram form, a timeline of a method according to an embodiment.

DETAILED SUMMARY OF PARTICULAR EMBODIMENTS

FIG. 1 illustrates a telecommunication network WAN used to route data streams representing an audio-visual content (item), formed of segments, from a content server $S_{OTT}$ to clients C1, C2.

These data streams can be streams associated with audio-video content (i.e. containing video data and/or audio data), and where applicable interactive content corresponding for example to video games. It can be on-demand content or live content, of IPTV (Internet Protocol Television) type, but other modes of transmission may also be envisioned.

This telecommunication network can typically be composed of several interconnected networks, particularly an access network allowing clients to connect to a main network (itself composed of an interconnection of sub-networks) or "backbone". This network WAN is commonly known as the Internet.

Clients can be connected to a local network, LAN, for example a wireless local network, allowing them to access a gateway to the Internet access network. This wireless local network, commonly called WLAN for "Wireless Local Area Network" can be compliant with Wi-Fi, or wifi, protocols, as specified in the standards documents of the IEEE of the 802.11 (or ISO/CEI 8802-11) family.

This local network LAN can be a network inside a residence (home network), for example used to connect all the equipment, or clients, of a user or family. The local network LAN can also be an internal network of a business, used to connect equipment, or clients, of the different users of the business.

The clients can be of different kinds, their common point being that they possess means allowing connection to the network. These are essentially radio communication components and electronic and computer components allowing the implementation of the protocol stacks needed to manage the protocols associated with the network and to receive and send data packets.

The clients can also produce audio-video content. This can be produced on a content screen or associated with the clients, or else via a projector, or else via loudspeakers, for example in the case of audio-only content (radio etc.).

The clients C1, C2 may be of different kinds: computer (laptop or desktop), mobile communication terminal of "smartphone" type, digital tablet, connected television etc.

The television can be natively connected or be connected by way of an associated device such as for example a TV key connected to the television, generally a High Definition Multimedia Interface (HDMI). An example of an external device communicating with a television TV is Chromecast™. The Chromecast™ device is a real-time multimedia stream reader device (multimedia gateway) developed and marketed by Google. The device is plugged into the HDMI port of a television and communicates, by Wi-Fi connection, with another device connected to the Internet (computer, smartphone, tablet etc.), in order to display on the television the multimedia content received from an application compatible with the Google Cast technology, from the Google Chrome™ browser present on a computer, or from certain Android devices.

These various clients are also provided for the receiving and processing of the content segments.

In particular, they may possess a software application (for example a browser) making it possible to access web servers or other servers, which make it possible to make audio-video content available to the users of the clients. Thus, the different exchanges between the clients and the content servers $S_{OTT}$ can be done in accordance with the protocols currently used on the Internet network, particularly the HTTP protocol.

Dynamic Adaptive Streaming over HTTP, often named DASH or MPEG-DASH or else HAS (HTTP Adaptive Streaming) is a format standard for audiovisual streaming over the Internet. It is based on the preparation of the content in different presentations of variable quality and bitrate, cut into segments of short duration (a few seconds). Each of these segments is made available individually by means of an exchange protocol. The main protocol concerned is HTTP, as the name indicates, but the specification explicitly allows for other protocols (for example FTP) to be used. The organization of the segments and the associated parameters are published in a manifest in XML format.

The ISO/IEC 23009 standard, finalized in late 2011 defines the format of the manifest as well as that of the segments based on MPEG container formats: ISO Base Media File Format (ISO/IEC 14496-12) and MPEG-2 Transport Stream (ISO/IEC 13818-1), and gives indications for the definition of other formats of segment.

This distribution mode is typically known as ABR for Adaptive Bit Rate.

The different resolutions in which a content is available are published in the manifest file. The clients can choose the desired resolution from among those available when they request the following segments of the content. They can thus adapt dynamically to the available bandwidth on the network WAN according to the estimated or measured throughput.

The resolutions correspond to qualities of the video (and/or audio) content and consequently to different bitrates on the telecommunication network.

The qualities available in ABR mode may vary according to the video streaming platform used, but in general and at the present time, commonly available qualities comprise:

- Very low quality: often suitable for users with very slow or unstable Internet connections, this quality can have a resolution of de 240*p* and a bitrate of 200 kbps.
- Low quality: this quality is suitable for more stable but still relatively slow Internet connections, with a resolution of 360p and a bitrate of 400-700 kbps.
- Standard quality: this quality is suitable for most Internet connections, with a resolution of 480p or 720p and a bitrate of 800 kbps to 2 Mbps.
- High quality: this quality is suitable for rapid and reliable Internet connections, with a resolution of 1080p and a bitrate of 2-5 Mbps.
- Very high quality: this quality is suitable for very fast Internet connections, with a resolution of 4K and a bitrate of over 10 Mbps.

It is important to note that the available qualities can vary according to the bandwidth capacities of the user and of the network, as well as the quality and complexity of the view content streamed. The "manifest" file can then be modified according to the variations made at network or content server level.

Provision can also be made for a managing entity G. This managing entity G is located in the local network LAN. It can be implemented by an equipment connected to this local network.

This equipment can be an access gateway to the data telecommunication network (Internet), or else a client (telecommunication terminal, computer, television etc.) This equipment can also be a set top box. It can also be a separate equipment, specifically designed to implement the functionality of the managing entity G.

The managing entity G can have the function of allowing the clients C1, C2 to access the content offered by the content server or servers Son. In particular, it can aggregate content offered by different content servers and present them over a uniform interface.

In particular, the managing entity G can publish information relating to the content available from the different content servers Son so that the clients can access them and can where applicable select them to trigger their download.

In particular, the managing entity G can retrieve the manifests from the different content servers $S_{OTT}$ and publish them to the clients so that they can select a desired content at a desired resolution, and trigger the download of the desired segments.

The download can be done by way of the managing entity G or else directly from the content server to the client. In this second case, the role of the managing entity G is to provide the manifest that contains the reference of the segments to be retrieved from an identified content server $S_{OTT}$.

Furthermore, the managing entity can aggregate content from diverse sources. Provision can in particular be made for it to possess an interface allowing the receiving of digital terrestrial television TNT (for "Télévision Numérique Terrestre" in the French language) _content from a content server $S_{TNT}$.

Digital terrestrial television (DTT) is a mode of broadcasting of multimedia content, mainly video, by a specific network of Hertzian re-transmitters. Different standards have been established according to the country: the standard DVB-T for Europe, ATSC for the United States, DTMB for China, etc.

Other content streaming services, separate from the telecommunication network WAN can also be used by the managing entity G (and the equipment implementing it), such as a cable streaming service, a satellite streaming service, etc.

FIG. 2 illustrates a functional architecture, very high-level and in diagram form, of such a managing entity G, according to an embodiment.

As described previously, this managing entity includes a first interface 11 suitable for receiving content in the form of data segments from a first content server $S_{OTT}$ over a data telecommunication network WAN.

It also includes a second interface 12 suitable for receiving content from a server $S_{TNT}$ of a streaming service separate from said data telecommunication network, as previously explained. This interface is separate since the routing of the data coming from the server $S_{TNT}$ uses separate technical means from those of the data telecommunication network WAN employed for the segments coming from the content servers $S_{OTT}$.

It also includes processing means TRT making it possible to implement the different mechanisms described, and in particular the production of information relating to the content to the clients connected to the managing entity, through a third interface 13.

It further includes an encoder E suitable for encoding a stream of segments from a content received from the second interface 12, as well as a fourth interface 14 suitable for receiving managing messages.

On FIG. 2, the hatched arrows illustrate a possible stream of manifests, while the solid arrows illustrate other types of traffic, particularly the content segments or a content transmitted constantly.

It should be noted that this figure illustrates a functional architecture for explanation purposes only. It is obvious to those skilled in the art that the managing entity can include many other functions and that the illustrated functions can interact in different ways.

As explained previously, this managing entity G is a functional entity able to be incorporated into various equipment related to the local network LAN.

The equipment implementing this managing entity G can in particular comprise a gateway suitable for providing access to the data telecommunication network (Internet) to the client. It can also have the function of providing a local network LAN for these clients (WiFi router etc.). An example of such a home equipment is the Livebox™ from the company Orange.

The equipment implementing the managing entity G can also comprise a client C1, C2.

The equipment implementing the managing entity G can also comprise a set top box, STB. Such a set top box is conventionally deployed to receive and decode content from distribution networks such as digital terrestrial television, TNT.

The equipment implementing the managing entity G can also comprise a specific equipment, or one within a client. By way of example, it can be incorporated into a device of "TV key" type. Thus, such a TV key can provide connectivity to a television (or similar equipment) and, at the same time, the functionality specific to the managing entity gestion G.

In all these implementations, the managing entity G is connected to the home local network LAN, so that all the clients can have access to it and benefit from its functionality.

FIG. 3 illustrates a flowchart of a method which can be implemented by this managing entity G.

In step S1, a content (item) is determined.

This content can be determined from among the content available on the content servers $S_{OTT}$ or else it can be a content not available on these servers.

The content can for example be a special content. The term "special" means that this content has a specific nature and/or is identified as special by a manager of the content, or administrator. Typically, a content can be identified as "special" solely with the aim of triggering the special processing described here.

This content can be determined due to a large audience or a prediction of a large audience. In particular, the special content can be a content, the audience (current or predicted) of which is greater than a given threshold.

For example, a content related to an important event is liable to generate a large audience and therefore be determined as a special content. For example, an important football match, a news show about a human or natural disaster, an important political event (President's speech etc.), etc. are events which can give rise to large volumes of traffic.

For example, the determination of the "special" (or specifically processed) content(s) can be based on traffic predictions for available content.

In particular, one (or more) content can be selected by an administrator or by an automatic system having access to the traffic trends and suitable for making predictions or for determining crossings of traffic thresholds associated with the different contents.

A managing device MD (on FIG. 1) can then transmit a management message to the managing entity G (for example over its interface (4) indicating a content that the managing entity G can thus determine.

When a content is thus determined, for example when the content is a special content, in a step S2, the gateway can transmit a request to access this content to the server $S_{TNT}$ of a streaming service separate from the data telecommunication network WAN. The implementation of the access request can depend on the type of server and on the underlying technology. It can typically be a subscription. This access request can trigger the transmission by this server $S_{TNT}$ of the content subscribed to toward the interface 12 of the managing entity G.

In a step S3, the managing entity G can then encode the content received from the server $S_{TNT}$ into a stream of content segments. These segments are for example compliant with the encoding for distribution by dynamic adaptive streaming over http (HAS for HTTP Adaptive Streaming).

Since the content received over the interface 12 is not routed through a data telecommunication network, it does not undergo fluctuations in load and traffic and thus does not have to be adaptive. In general, this content consists in a continuous data stream, with no segmentations by different resolution.

Typically, the different digital terrestrial remote streaming standards make use of the MPEG transport stream. The content is mainly composed of a stream of MPEG frames that the managing entity G can receive on an ad hoc basis.

A major difference is that reception is done continuously, on an ad hoc basis, without any need for the receiver (here the managing entity G) to request the content segment by segment, by sending as many requests to the transmitter (here the content server) based on a manifest. Contrariwise, once subscribed to a content, the receiver receives the corresponding data until it performs an action to interrupt this transmission.

The managing entity G includes means E for encoding this continuous stream into segments, in accordance with an underlying technology, for example for HAS streaming.

The encoded segments can be stored in a memory contained in or associated with the managing entity G. This storage may be temporary, until the segments are transmitted to the clients that have requested them.

The encoded segments may be individually retrieved by the clients C1, C2.

Furthermore, in step S4, the managing entity G can publish information relating to the content suitable for allowing the clients C1, C2, to retrieve the stream of previously encoded segments and to decode it.

In particular, in an embodiment, this information may comprise a set of manifests generated by the managing entity G and relating to these streams of segments. These manifests (generally in XML format) contain the data allowing clients to retrieve the segments, individually, at the desired resolution among those available (i.e. those for which segments have been encoded).

According to an embodiment, the manifests and the segments encoded in step S3 only relate to a single resolution of the content.

Specifically, ABR/HAS dynamic adaptive transmission is beneficial for compensating for fluctuations in bandwidth over a telecommunication network. When the bandwidth is low, the client can opt for a low resolution to be able to continue to access the content, at the expense of degraded quality.

It is however reasonable to assume that the load and bandwidth of a local network LAN does not vary much. Due to the low demand on the network, a single quality of segment can be encoded.

One can thus save on the resources of the managing entity G (i.e. the equipment implementing it), by avoiding encoding one and the same content in several resolutions.

Thus, content from a server $S_{TNT}$ for example of digital terrestrial television, TNT (for "Télévision Numérique Terrestre" in the French language) type may be accessible to a managing entity G in the same way as if it was content provided by an over-the-top OTT distribution service.

In other words, the offer of content from digital terrestrial television, TNT, or various other sources, can thus be incorporated into one CDN (Content Delivery Network).

Thus, the clients can have a unified view of the different contents available. Whether the content is available on a content server through a data network (Internet), in OTT mode, or else over a separate server, in TNT mode, can be invisible to the client. It can thus access all sorts of content, independently of the underlying streaming technology, through a uniform interface supplied by the managing entity G.

The managing entity G can in particular offer application behaviors corresponding to the different scenarios, while optionally masking these differences to the user of the clients.

Through an interface available over its client C1, C2, in collaboration with the managing entity G a user can browse through the different available contents. These may be available from a server $S_{OTT}$ providing content segments, or from a server $S_{TNT}$ providing a continuous flow. These different mechanisms may be highlighted on the interface, for information purposes, or else masked to the user.

When the user selects a content available on a server $S_{OTT}$, the managing entity G tells the client, via a manifest, to go and search for the segments corresponding to this content directly on this server (in unicast mode). When the user selects a content available on a server $S_{TNT}$, the managing entity G produces for the client a manifest setting out the segments encoded locally by the managing entity G, and telling it to retrieve them directly over this managing entity G.

It is also possible to put in place a multicast adaptive dynamic streaming system of mABR (multicast ABR) type. In which case, the content available as a multicast will also find a place on the interface offered by the managing entity G, and will thus be available to clients C1, C2.

Thus, when a content is the subject of heavy traffic, it can be made available via a streaming network separate from the data telecommunication network, for example by a digital terrestrial television service TNT, and offered to clients via the managing entity G which can be implemented on an equipment they habitually use.

When this content is also available via a server SOTT of an over-the-top OTT distribution service, access to this content can be masked and replaced by access to the content available from the TNT service. Thus, the user can no longer access the content via the data network, and thus contribute to its load.

Firstly, the experience of the user is improved since access to the content is no longer degraded by the load of the data network or of the server $S_{OTT}$, and secondly it no longer contributes to this load by no longer using the server $S_{OTT}$.

One thus avoids congestion of the data telecommunication network WAN, by load shedding, for content with large audiences, to a third-party distribution mode, separate from the telecommunication network.

Furthermore, the reception of content coming from this third-party distribution mode (for example digital terrestrial television TNT) can be mutualized and redistributed locally to a set of clients connected to the local network LAN Finally, let us specify here that the term "entity" may correspond just as well to a software component as to a hardware component or a set of hardware and software components, a software component itself being equivalent to one or more computer programs or subprograms or more generally to any element of a program able to implement a function or a set of functions as described for the concerned modules. In the same way, a hardware component is equivalent to any part of a hardware assembly able to implement a function or a set of functions for the concerned module (integrated circuit, chip card, memory card, etc.).

Of course, this invention is not limited to the examples and embodiments described and shown, but is defined by the claims. It is in particular able to undergo many variants accessible to those skilled in the art.

The invention claimed is:

1. A method comprising:

managing access by network equipment to content available on at least a first server providing said content in the form of data segments over a data telecommunication network and a second server providing a streaming service separate from said data telecommunication network, said managing comprising:

selecting a server out of said first server and said second server; and in response to said second server being selected:

sending, by the network equipment, a request for access to the content to the second server;

receiving, by the network equipment, a stream of segments based on said content from the second server;

encoding, by the network equipment, the stream of segments based on said content; and publishing, by the network equipment, information relating to said content suitable for making it possible to decode said stream of segments.

2. The method as claimed in claim 1, wherein said streaming service separate from said telecommunication network is a digital terrestrial television service.

3. The method as claimed in claim 1, wherein said second server is selected when said content is a particular content.

4. The method as claimed in claim 3, wherein said content is a content, an audience of which is greater than a given threshold.

5. The method as claimed in claim 4, including, prior to the selecting, determining the content based on predictions of traffic for the content.

6. The method as claimed in claim 1, wherein said information comprises a set of manifests generated by the network equipment and relating to said stream of segments.

7. The method as claimed in claim 6, wherein said manifests and said segments only relate to a single resolution of said content.

8. Network equipment comprising:

at least one processor; and at least one non-transitory computer readable medium comprising instructions stored thereon which when executed by the at least one processor configure the network equipment to manage access by a client to content available on at least a first content server providing said content in the form of data segments over a data telecommunication network and a second server providing a streaming service separate from said data telecommunication network, said managing comprising:

selecting a server out of said first server and said second server; and in response to said second server being selected:

sending a request for access to the content to the second server;

receiving a stream of segments based on said content from the second server;

encoding the stream of segments based on said content; and publishing information relating to said content suitable for making it possible for said client to decode said stream of segments.

9. The network equipment as claimed in claim 8, wherein the network equipment is a gateway.

10. The network equipment as claimed in claim 8, wherein the network equipment is a client equipment.

11. A non-transitory computer readable data medium on which a series of program code instructions is stored, which when executed by a processor of a network equipment configure the network equipment to execute a method of managing access to a content available on at least a first server providing said content in the form of data segments over a data telecommunication network and a second server providing a streaming service separate from said data telecommunication network, said method comprising:

selecting a server out of said first server and said second server; and in response to said second server being selected:

sending a request for access to the content to the second server;

receiving a stream of segments based on said content from the second server;

encoding the stream of segments based on said content; and publishing information relating to said content suitable for making it possible to decode said stream of segments.

* * * * *